(12) United States Patent
Jackson et al.

(10) Patent No.: US 8,845,174 B2
(45) Date of Patent: Sep. 30, 2014

(54) ENERGY-EFFICIENT LIGHTING PANEL

(76) Inventors: Nicholas Jackson, Carol Stream, IL (US); Brian Retzke, Downers Grove, IL (US)

( * ) Notice: Subject to any disclaimer, the term of this patent is extended or adjusted under 35 U.S.C. 154(b) by 415 days.

(21) Appl. No.: 13/215,596

(22) Filed: Aug. 23, 2011

(65) Prior Publication Data

US 2013/0051068 A1    Feb. 28, 2013

(51) Int. Cl.
*F21V 7/04* (2006.01)
*F21V 99/00* (2006.01)

(52) U.S. Cl.
CPC ...................................... *F21V 99/00* (2013.01)
USPC ............ 362/619; 362/613; 362/617; 362/628

(58) Field of Classification Search
CPC .. G02B 6/0011; G02B 6/0096; G02B 6/0013; G02B 6/0015; G02B 6/002; G02B 6/0033; G02B 6/0035; G02B 6/0038; G02B 6/0041; G02B 6/0043; G02B 6/0045; G02B 6/005; G02B 6/0051; G02B 6/0055; G02B 6/0065; G02B 6/0066; G02B 6/0068; G02B 6/0073

USPC ................. 362/602, 603, 608, 612, 613, 615, 362/617–619, 623–625, 627, 628
See application file for complete search history.

(56) References Cited

U.S. PATENT DOCUMENTS

| | | | |
|---|---|---|---|
| 6,520,655 B2* | 2/2003 | Ohuchi | 362/612 |
| 2004/0196667 A1* | 10/2004 | Lea | 362/583 |
| 2005/0122716 A1* | 6/2005 | Castelli | 362/227 |
| 2007/0236960 A1* | 10/2007 | Anderson et al. | 362/627 |

* cited by examiner

*Primary Examiner* — Thomas M Sember
(74) *Attorney, Agent, or Firm* — Joseph P. Krause

(57) ABSTRACT

A light-weight and energy-efficient lighting panel is constructed from a light-transmissive and light diffusive extrusion formed to have elongated hollows, which are hollow structures or volumes between two surfaces, at least one of which is transmissive and diffusive. Light projected into the hollow flows through the hollow and part of the light is emitted through the light transmissive and diffusive surfaces. Even though the light sources are located at the edges of a panel, the surface of the panel appears to be uniformly light by light sources distribute directly behind the panels rather than along the edges.

6 Claims, 6 Drawing Sheets

ENERGY-EFFICIENT LIGHTING PANEL

BACKGROUND

Light emitting diodes are energy efficient and emit little thermal energy, but because they are small, they are ill-suited to provide meaningful illumination to large, open spaces commonly found in offices. A mechanism for collecting, diffusing and projecting light from several light emitting diodes would be advantageous over the prior art, if such a mechanism could also be manufactured inexpensively. An energy efficient lighting panel that can gather light from numerous diodes or other energy-efficient light sources, diffuse the light so that it does not seem to originate from LEDs or other point sources, and transmit the light would be an improvement over the prior art.

DETAILED DESCRIPTION

Figure 1:
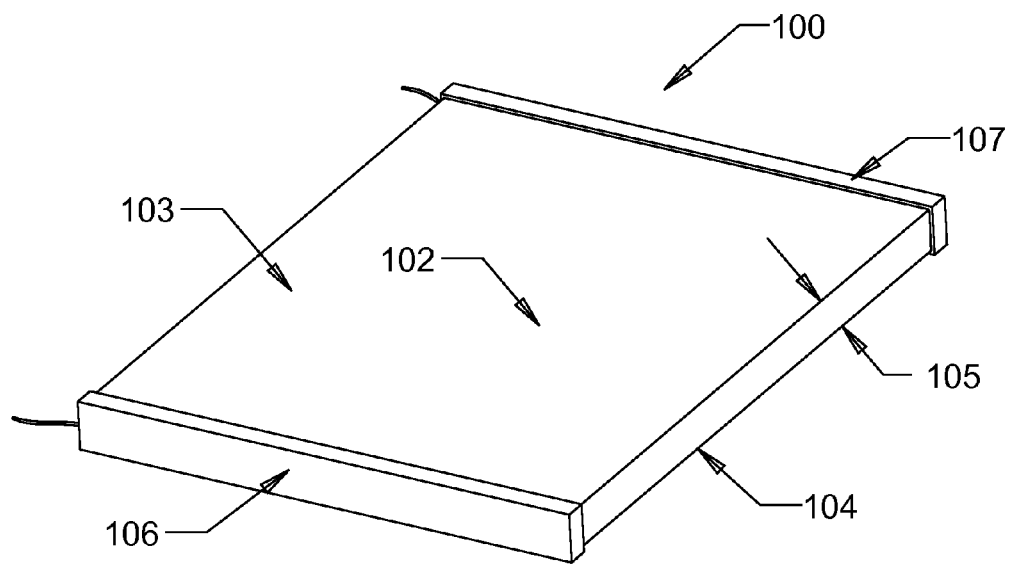
FIG. 1 is a perspective view of a light panel.

FIG. 1 is a perspective view of a light panel 100. The light panel 100 is comprised of an illumination panel 102 having an upper surface 103, which is both light transmissive and light diffusive. Light sources located along the edges of the panel project light inwardly, i.e., into the panel from the edges. The light sources emit a uniform level of light energy such that light transmitted through the panel's surface appears to originate from either a uniformly distributed light source behind the panel, or numerous individual light sources behind the panel, rather than light sources located along its edges and which project light into empty space beneath the upper surface 103.

As used herein, the term "transmissive" should be construed to mean that light is able to pass-through the panel. The term "diffusive" should be construed to mean tending to diffuse. Since "diffuse" means not concentrated or not localized, diffusive should be construed to mean tending to diffuse, de-localize or not concentrate. By way of example, an incoherent, i.e., non-laser, point light source located behind the upper surface 103 will thus appear to be larger and will tend to make the upper surface 103 appear as if it is entirely illuminated from its back side, which, not shown but within the body of the light panel 100.

The light panel 100 is also comprised of a back side 104, not visible in FIG. 1 because FIG. 1 is a perspective view of the light panel 100. The upper surface 103 and the back surface 104 are separated from each other by a separation distance 105. The separation between the upper surface 103 and the back surface 104 is maintained by one or more internal web sections, not visible in FIG. 1.

A left end cap 106 and a right end cap 107 enclose one or more elongated hollows, which as described below, extend between the left end cap and the right end cap and through which light from a light source travels. Since the light waves from light sources used with the panel 102 are incoherent, at least part of the light traveling through the hollows passes through the light transmissive and light diffusive upper surface 103.

Figure 2:
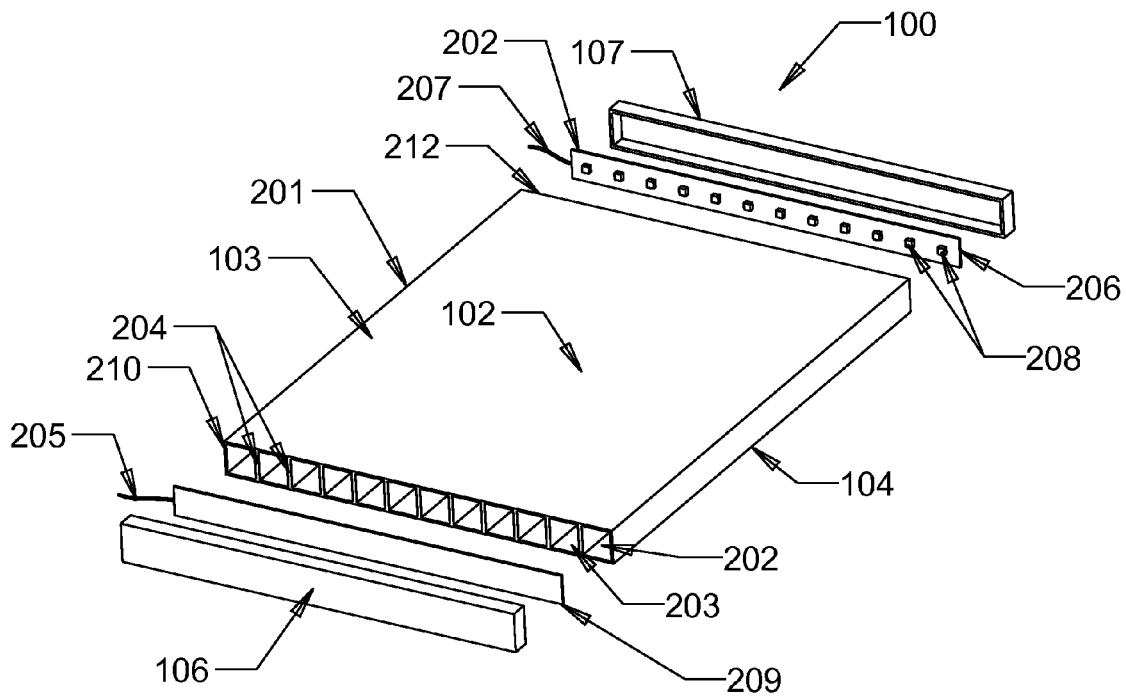
FIG. 2 is an exploded view of the light panel depicted in FIG. 1.

FIG. 2 is an exploded view of the light panel 100 depicted in FIG. 1. The upper light transmissive and light diffusive surface 103 is planar. It is formed by extruding a plastic material thin enough to allow light to pass through it and to diffuse the light. The hollows are identified by reference numeral 202. Vertical side walls identified by reference numeral 204, are considered herein to be the aforementioned web sections 204. The entire panel, including the top, bottom and side walls are preferably formed by one extrusion, all at once.

The hollows 202 have first and second ends. The first end being proximate to the left end cap 106, the second end being proximate to the right end cap 107. As stated above, the hollows 202 are formed by a substantially vertical wall that forms the aforementioned web section 204. Several web sections are shown in FIG. 2, each of which extends between the upper light transmissive surface 103 and the back surface 104. Since the upper light transmissive and light diffusive surface 103 of panel 102, the web sections 204 and the back surface or backside 104 are formed by extruding a plastic, all of them preferably have the same light transmissive and light diffusive properties allowing any of the surfaces to be used as light emitting.

Two light strips 206 and 209 are comprised of integrated circuit boards, attached to which are light sources 208 such as light emitting diodes or incandescent bulbs. Electric energy is provided to the light sources 208 by connecting wires 205 and 207 to a power source. For brevity, light emitting diodes, incandescent bulbs or other light types are collectively referred to hereinafter as light sources, which are identified in FIG. 2 by reference numeral 208.

The bodies of the light sources 208 project into the hollows 202 by a small distance. Since the light sources are mounted to a circuit board, the surface of which is held against the ends of the extruded panel 102, and projects into the hollows, the light sources 208 are thus considered herein to be operatively coupled to the corresponding left end 210 and the right end 212 of the extrusion which forms the extruded light transmissive and light diffusive panel 102. The light sources 208 direct light into the hollow and of course, along the back or reverse or interior side of the upper surface 103.

Light emitted from the light sources 208 will of course travel down the hollows 202. Since the light is incoherent, at least part of the light passing through the hollow will also pass through the upper surface 103 because the upper surface is transmissive as well as diffusive. Inasmuch as the web structures 204 and the back surface 104 are also formed from the same plastic, the light from the light source 208 will also pass at least partly through those surfaces as well, unless the surfaces of those structures are coated with an opaque or reflective material.

The back surface 104 of the extruded panel 102, which is opposite the top surface 103, has its own "upper surface" 203, which is "inside" the hollow 202 or facing into the hollow 202. In one embodiment, the top or interior surface 203 of the back surface 104 is coated with a polished aluminum or other reflective surface. Such a coating will tend to direct the incoherent light from the light sources 208 upwardly or out through the top or upper surface 103 of the light transmissive panel 102. The back surface 104 could also be coated with a reflective material to provide a similar result.

Figure 3:
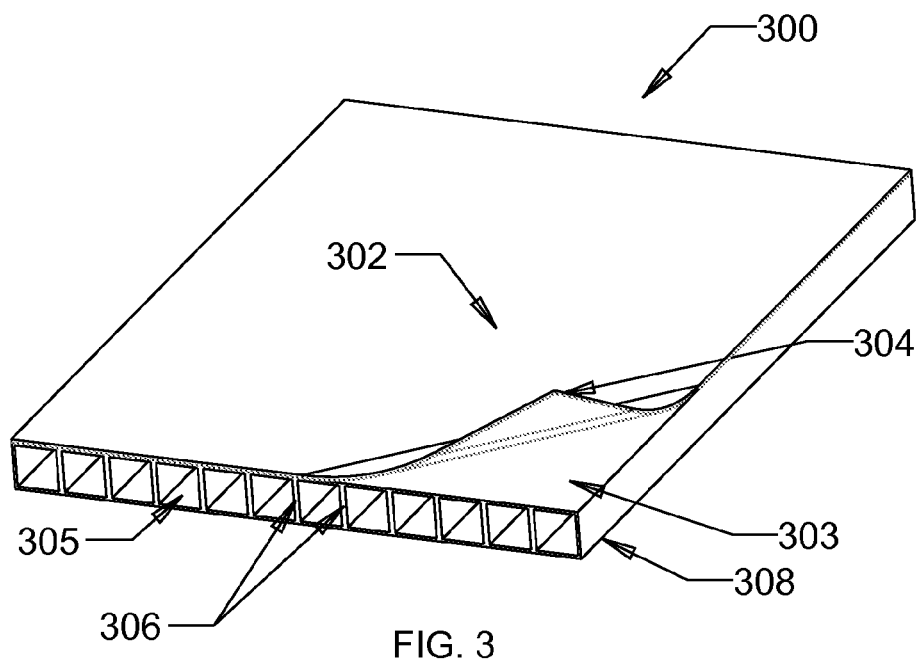
FIG. 3 is a perspective view of a first alternate embodiment of the light panel shown in FIG. 1.

FIG. 3 is a perspective view of a first alternate embodiment of the light panel 100 shown in FIG. 1. In FIG. 3, the light panel 300 is comprised of an extruded plastic that is transmissive but not diffusive. An upper surface 303 is coated or overlaid with a light transmissive and light diffusive film 304. In one embodiment, the film 304 passes all light wavelengths, in which case the entire upper surface 302 of the panel 300 will appear to emit white light when a white light passes through the hollows 305. In another embodiment, the diffusive film 304 allows narrow bands or ranges of wavelengths to pass through, i.e., the film 304 appears to be colored or tinted. In such an embodiment, the entire panel 300 will thus appear to emit a uniform or substantially-uniform colored light. Color added to the film 304 can also be patterned or areas of the film colored differently and randomly.

Figure 4:
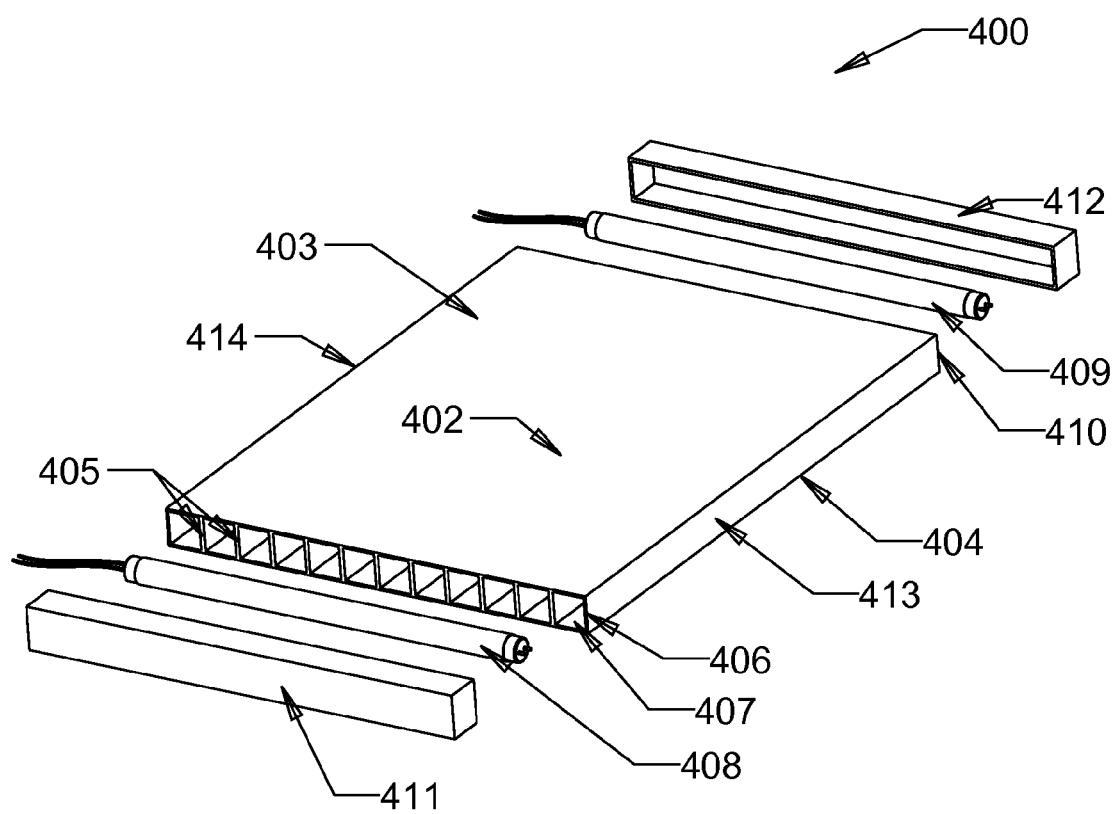
FIG. 4 is an exploded view of another alternate embodiment of a light panel.

FIG. 4 is an exploded view of an alternate embodiment of the light panel 100 depicted in FIG. 1. A plastic that is at least partially light transmissive and light diffusive 402 is extruded to form the same illumination panel structure that is shown in FIG. 1 but which is identified in FIG. 4 by reference numeral 402.

A substantially planer upper surface 403 and a substantially planer lower surface 404 are separated from each other by substantially vertical web sections 405 that maintain the separation distance between the upper surface 403 and the lower surface 404. The web sections in each embodiment also provide flexural rigidity to the panel 402. Spacing between the web sections 405 is a design choice, however, those of ordinary skill will recognize that panel stiffness will be directly proportional to the number of web sections. The greater the number of web sections 405, the stiffer the panel 402 will be, but at the expense of additional material and therefore cost to provide additional extruded web sections 405.

Unlike the light strips 206 and 209 shown in FIG. 2, the illumination panel 400 shown in FIG. 4 is provided with two, substantially cylindrical, conventional fluorescent tubes 408 and 409, which are also considered herein to be light sources. The light sources 408 and 409 are shown located outside or beyond the left end 406 of the panel 402 and the right end 410 of the panel 402. The light sources 408 and 409 are thus considered to be outside of the hollows 407 formed by the aforementioned web sections 405. End caps 411 and 412 are sized, shaped and arranged to frictionally engage the upper surface 403 and the opposing rear surface 404 the front wall 413 and an opposing back wall 414 to hold the light sources 410 up against the web sections 405 yet remain outside the hollows 407.

Figure 5:
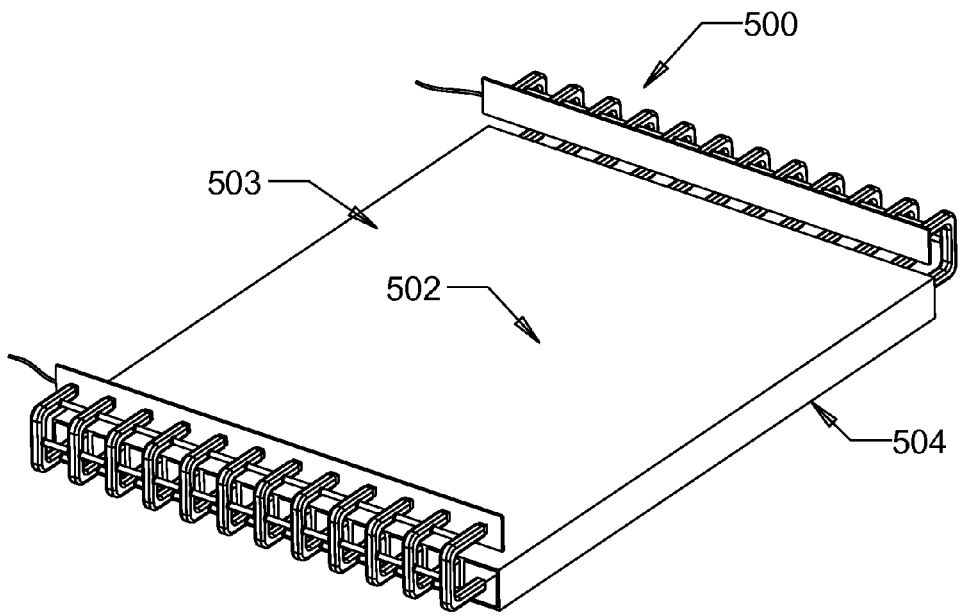
FIG. 5 is a perspective view of another embodiment of a light panel.
Figure 6:
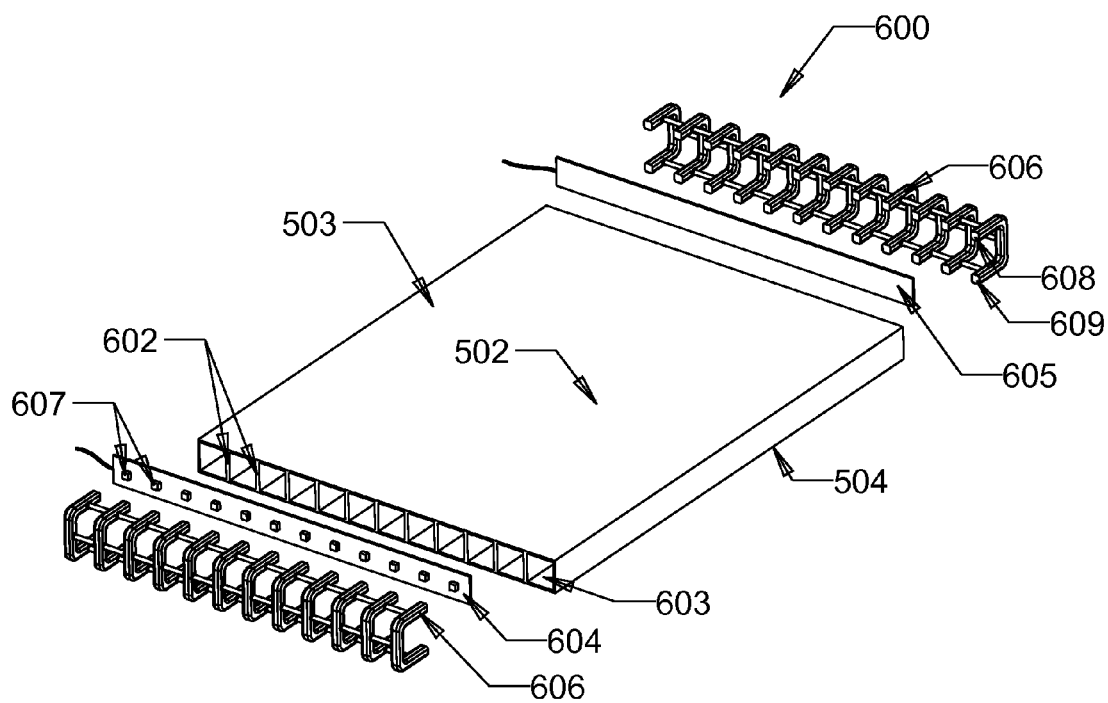
FIG. 6 is an exploded view of the structure shown in FIG. 5.

FIG. 5 is a perspective view of yet another embodiment of a light panel 100. FIG. 6 is an exploded view of the same structure.

Referring now to FIG. 6, an extruded, transmissive and diffusive illumination panel 502 has a planar upper light transmissive and light diffusive surface 503 spaced apart and separated from a rear surface 504 by several web sections 602.

Two light strips 604 and 605 are each comprised of substantially U-shaped light pipes 606. As used herein, "light pipe" should be construed to mean an optical fiber or a solid transparent plastic rod that transmits light lengthwise, i.e., along the length of the light pipe structure. In FIG. 6, the light pipes 606 are substantially U-shaped. Light sources 607 on light strips 604 and 605 direct light into the light pipes 606, which conduct the light in a U-shaped material, into the hollows 603. Light emitted from the externally-located light sources 607 is projected into a first or upper end 608 of the U-shaped light pipe 606. At the lower end 609, light leaves the light pipe and projects into the hollows 603 where at least part of the light travels through the hollow and at least part of that light passes through the light transmissive and light diffusive top surface 503. The light sources 607 in FIG. 6 are thus spatially separated from the hollows 603 yet transmit light through the light conduits embodied as the light pipes 606. For purposes of claim construction, a light pipe 606 in combination with a light source 607 should also be considered to be a light source.

FIGS. 7-10 depict alternate embodiments of the web sections used to "rigidize" or strengthen an extruded plastic, illumination panel.

Figure 7:
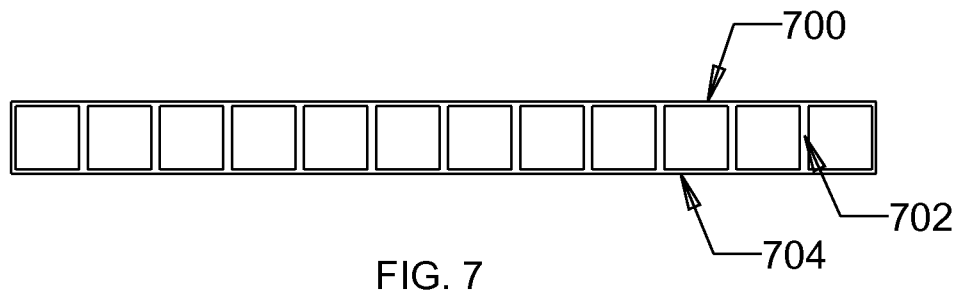
FIGS. 7-10 depict alternate embodiments of the web sections used to strengthen and provide hollows for an illumination panel.

FIG. 7 depicts the web cross section shown in FIG. 2. The web sections 702 are uniformly spaced, vertical or substantially vertical, relative to the top surface 700 of the panel and the bottom surface 704 to form a single-layered illumination panel.

Figure 8:
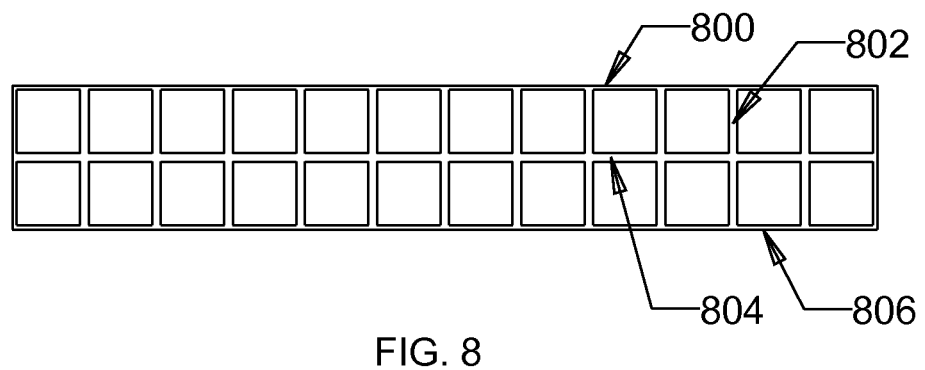

In FIG. 8, an intermediate layer 804 is separated from a top layer 800 and a bottom layer 806 by web sections 802 that extend between both the top layer 800 and bottom layer 806.

Figure 9:
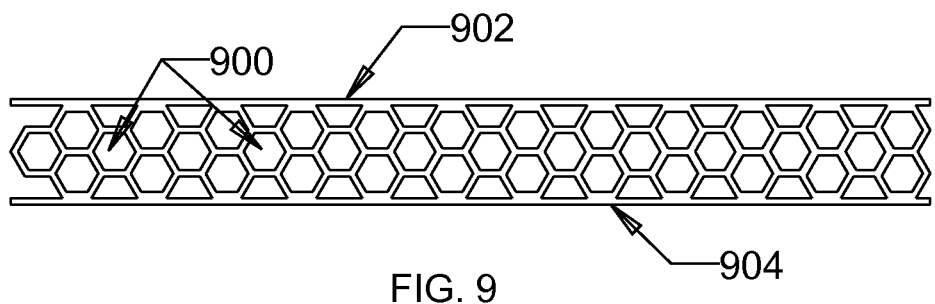

FIG. 9 depicts a web section reminiscent of a honeycomb. Hexagonally-shaped hollows 900 are formed by extruding. The wall sections between the hexagonally-shaped hollows are sufficiently thin so that light sources in any one of the hexagonally-shaped hollows are able to transmit light through the most distant of the upper surface 902 and the lower surface 904.

Figure 10:
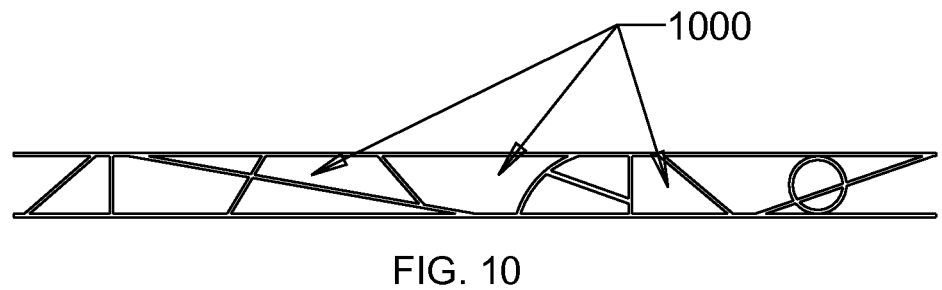

FIG. 10 shows a random cross-sectional shape web the hollows 1000 of which are also randomly shaped.

Figure 11:
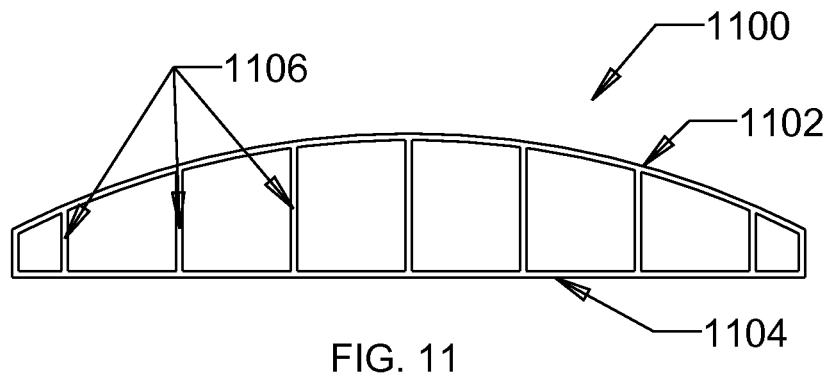
FIGS. 11-14 show other embodiments of a light panel.

FIG. 11 shows yet another embodiment of a light panel 1100. A substantially planar lower surface 1104 is separated by an upper curved surface 1102 by vertically-oriented web sections 1106, the lengths of which change according to the desired curvature of the upper surface 1102. The curved surface provided by the upper surface 1102 provides a more decorative and textured light source panel than do planar or substantially planar surfaces illustrated in FIGS. 1-10 when the curved surface faces into a living space where it can be seen.

Figure 12:
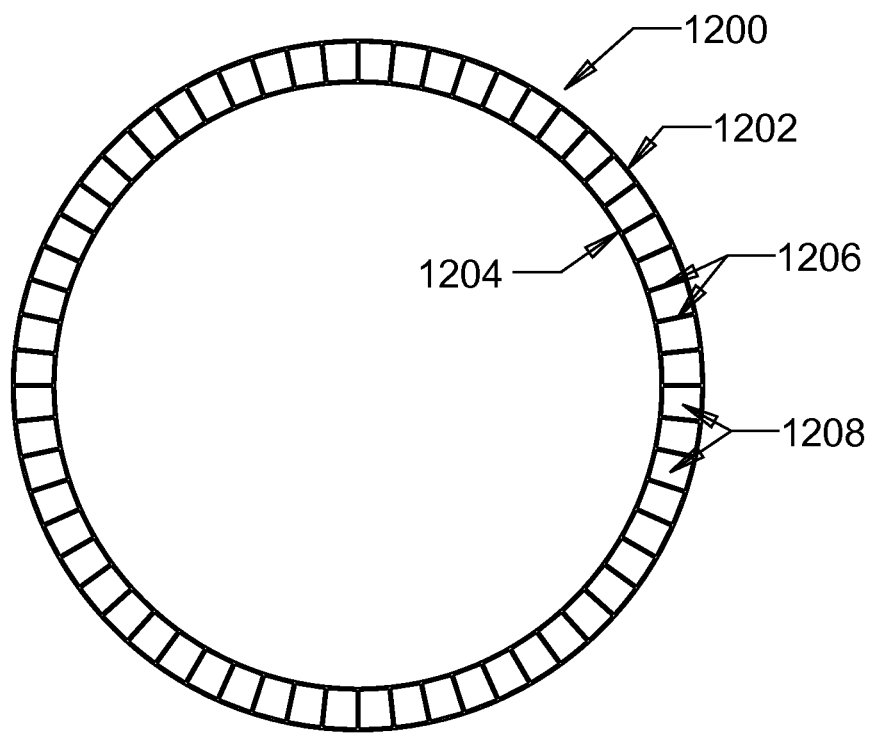

FIG. 12 depicts yet another light transmissive panel 1200. Two concentric light transmissive and light diffusive surfaces 1202 and 1204 have circular cross-sectional shapes. They are spaced apart from each other by several radially-oriented web sections 1206, which define hollows 1208. Each hollow 1208 thus forms a partial annulus and able to receive one or more of the light sources described above.

Figure 13A:
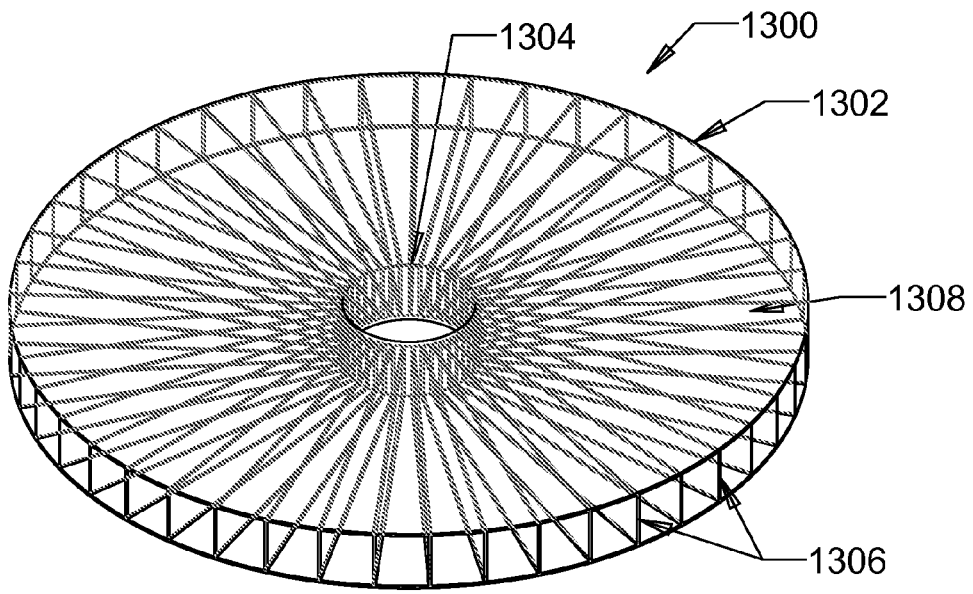
Figure 13B:
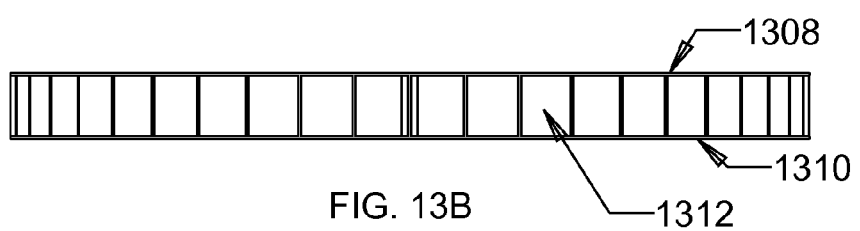

FIGS. 13A and 13B depict yet another embodiment of a light panel 1300. In this figure, the light panel 1300 is substantially pie-shaped having an outer edge 1302 and an inner edge 1304 between which extend several vertically-oriented web sections 1306 which maintains the spacing between a light transmissive and light diffusive upper surface 1308 and an optionally light transmissive and light diffusive lower surface 1310. The hollows 1312 are themselves pie-shaped sections defined by the radially-oriented web sections 1306. Light sources can be placed into the pie-shaped hollows at either the outer edge 1302 or the inner edge 1304.

Figure 14A:
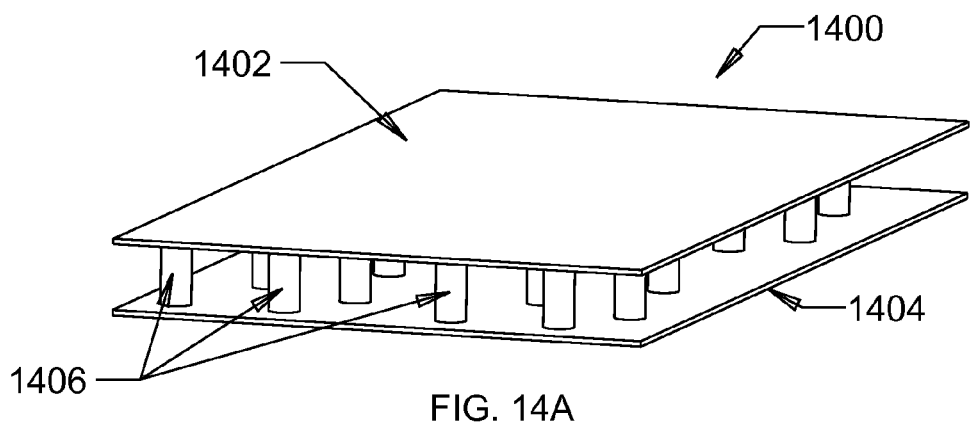
Figure 14B:
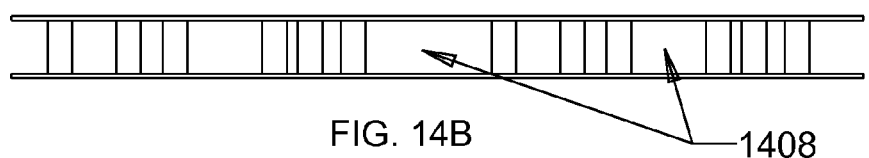

Finally, FIG. 14A depicts a perspective view of another embodiment of an illumination panel 1400. The panel is comprised of a light transmissive and light diffusive upper surface 1402 and a light transmissive and light diffusive lower surface 1404. As shown in FIG. 14A, the surfaces 1402 and 1404 are separated from each other by a plurality of posts 1406 that extend between the two surfaces 1402 and 1404. A hollow 1408 is embodied as the space between the panels and around the posts 1406. As can be seen in FIG. 14B, light sources such as those describe above, can be inserted into the hollow or fixed adjacent to its open edges projecting light into the hollow which will be reflected out of at least one of the surfaces 1402 and 1404.

It should be apparent to those of ordinary skill that the illumination panels can have opaque and transmissive sides that are either flat or curved. Light sources can be operatively coupled to hollows in illumination panels by being at least partially within a hollow, adjacent to or away from the hollow with emitted light conducted into the hollow by a light pipe.

As used herein, the term "web" refers to regular or irregular shapes that maintain a space between surfaces that comprise an illumination panel but which also define a "hollow" through which light will pass lengthwise but also be emitted through a transmissive side of the panel.

The illumination panel is preferably formed by extruding, however any method of manufacture can be used to construct the aforementioned light panel. A plastic for extruding should be selected that is both transmissive and diffusive, however, a clear or translucent plastic or acrylic can also be used with an overlaid diffusive layer.

The foregoing description is for purposes of illustration. The true scope of the invention is set forth in the appurtenant claims.

What is claimed is:

1. An illumination device comprising:
   a panel comprised of a plurality of elongated hollows, each hollow having first and second opposing ends, first and second spaced apart, substantially parallel and adjacent web sections, and at least one light transmissive side; and
   a plurality of light sources, wherein light sources are coupled to both ends of the plurality of the hollows, each light source directing light into a corresponding hollow;
   wherein the plurality of light sources are configured such that at least part of a light source is within the illumination panel, and located at least partially between first and second sides and between the first and second adjacent web sections; and
   wherein light emitted from the light sources that are within the illumination panel travels through the corresponding hollow and at least part of the emitted light passing through the hollow passes through the at least one light transmissive side.

2. The illumination device of claim 1, wherein the first and second sides of the panel comprise substantially planar, spaced apart and substantially parallel sheets, at least one sheet being at least partially light transmissive and light diffusive.

3. The illumination device of claim 2, wherein the illumination device is additionally comprised of a plurality of spacers extending between the first and second surfaces and configured to maintain, the spacers being configured to provide a separation distance between the first and second surfaces.

4. The illumination device of claim 3, wherein the spacers are comprised of a plurality of web sections.

5. The illumination device of claim 1 wherein the panel is formed by extrusion.

6. The illumination device of claim 1, wherein the panel is comprised of a plastic such that at least one surface that is at least fifty percent transmissive.

* * * * *